(12) United States Patent
Winterot et al.

(10) Patent No.: US 11,378,793 B2
(45) Date of Patent: Jul. 5, 2022

(54) CAMERA MODULE FOR A MICROSCOPE, AND METHOD FOR OPERATING SAME

(71) Applicants: CARL ZEISS MICROSCOPY GMBH, Jena (DE); SD OPTICS, INC., Seoul (KR); STEREO DISPLAY, INC., Anaheim, CA (US)

(72) Inventors: Johannes Winterot, Jena (DE); Michael Goelles, Jena (DE); Alexander Gaiduk, Jena (DE)

(73) Assignees: CARL ZEISS MICROSCOPY GMBH, Jena (DE); SD OPTICS, INC., Seocho-Gu (KR); STEREO DISPLAY, INC., Anaheim, CA (US)

( * ) Notice: Subject to any disclaimer, the term of this patent is extended or adjusted under 35 U.S.C. 154(b) by 0 days.

(21) Appl. No.: 16/979,227

(22) PCT Filed: Mar. 6, 2019

(86) PCT No.: PCT/EP2019/055478
§ 371 (c)(1),
(2) Date: Sep. 9, 2020

(87) PCT Pub. No.: WO2019/170695
PCT Pub. Date: Sep. 12, 2019

(65) Prior Publication Data
US 2020/0400931 A1 Dec. 24, 2020

(30) Foreign Application Priority Data
Mar. 9, 2018 (DE) ...................... 10 2018 105 442.4

(51) Int. Cl.
G02B 21/36 (2006.01)
G02B 27/10 (2006.01)
(Continued)

(52) U.S. Cl.
CPC .......... *G02B 21/361* (2013.01); *G02B 27/10* (2013.01); *G02B 27/642* (2013.01); *H04N 5/2257* (2013.01)

(58) Field of Classification Search
None
See application file for complete search history.

(56) References Cited

U.S. PATENT DOCUMENTS 4,983,997 A * 1/1991 Kraft ................. G02B 21/361
396/315
6,056,409 A 5/2000 Grinblat
(Continued)

FOREIGN PATENT DOCUMENTS

DE 102008041821 A1 3/2010
DE 102012017917 A1 3/2014
(Continued)

OTHER PUBLICATIONS

Anonymous. "SD Optics Technical information & Strategies" Feb. 1, 2017 (Feb. 1, 2017)-Retrieved from the Internet: https :/ /www. slideshare.neUJ uH youngLee5/sd-opticsintroduction ?qid=9e5 82543-7055-4042-a72f-83d I 9aefc b3 l&v=&b=&from_search=l [retrieved on Jun. 6, 2019] XP055594552. Anonymous. "SD Optics Technical Information & Strategies" Feb. 1, 2017 (Feb. 1, 2017). Retrieved from the Internet: https: / /www. slideshare.neUJ uH youngLee5/ sd-opticsintroduction?qid=9e5 82543-7055-4042-a72f-83d 1 9aefc b3 l&v=&from_search=l [retrieved on Jun. 6, 2019] XP055594552 1m "3D Microscope. WISECOPEMALS—Structure of WISESCOPE (RDP Type)".
(Continued)

*Primary Examiner* — Reza Aghevli
(74) *Attorney, Agent, or Firm* — Mayer & Williams, PC; Stuart H. Mayer

(57) ABSTRACT

The invention relates first to a camera module for a microscope. The camera module comprises an optical interface for
(Continued)

inserting the camera module into an imaging beam path of the microscope, which imaging beam path images a nominal intermediate image. Furthermore, the camera module comprises an electronic image converter and a functional element for changing an intermediate image plane, which functional element is arranged in a beam path of the camera module between the optical interface and the image converter. The camera module also comprises a first optical assembly having an optical power, which first optical assembly is arranged in the beam path between the optical interface and the image converter. According to the invention, a distance between the functional element and the optical interface along the beam path or a distance between the first optical assembly and the optical interface along the beam path can be changed. The invention further relates to a method for operating the camera module.

15 Claims, 6 Drawing Sheets

(51) Int. Cl.
*G02B 27/64* (2006.01)
*H04N 5/225* (2006.01)

(56) References Cited

U.S. PATENT DOCUMENTS

| | | | |
|---|---|---|---|
| 6,943,072 | B2 | 9/2005 | Schmidt |
| 2,269,344 | A1 | 9/2007 | Nishioka |
| 7,269,344 | B2* | 9/2007 | Nishioka ............ G02B 13/0055 |
| | | | 348/240.2 |
| 2,345,816 | A1 | 3/2008 | Ri |
| 9,507,134 | B2* | 11/2016 | Levecq ............ G02B 21/0004 |
| 10,254,538 | B2* | 4/2019 | Hattori ............ G02B 17/008 |
| 10,359,612 | B2* | 7/2019 | Nobis ............ G02B 21/361 |
| 10,788,311 | B2* | 9/2020 | Hauger ............ G01B 11/24 |
| 2005/0111088 | A1* | 5/2005 | Winterot ............ G02B 21/361 |
| | | | 359/368 |
| 2005/0207003 | A1* | 9/2005 | Kobayashi ............ G02B 21/361 |
| | | | 359/368 |
| 2006/0245047 | A1* | 11/2006 | Hecker ............ G02B 21/06 |
| | | | 359/368 |
| 2008/0151226 | A1* | 6/2008 | Hecker ............ G02B 21/008 |
| | | | 356/73 |
| 2010/0214653 | A1* | 8/2010 | Pacholik ............ G02B 21/006 |
| | | | 359/379 |
| 2011/0043904 | A1* | 2/2011 | Lucke ............ G02B 21/00 |
| | | | 359/376 |
| 2011/0284767 | A1* | 11/2011 | Wolleschensky .. G01N 21/6458 |
| | | | 250/206 |
| 2011/0317260 | A1* | 12/2011 | Krueger ............ G02B 21/245 |
| | | | 359/383 |
| 2013/0228704 | A1* | 9/2013 | Kalkbrenner ............ G01N 21/64 |
| | | | 250/459.1 |
| 2014/0160266 | A1* | 6/2014 | Wereley ............ G02B 21/361 |
| | | | 359/399 |
| 2015/0042778 | A1* | 2/2015 | Levecq ............ G02B 26/06 |
| | | | 348/79 |
| 2015/0362713 | A1* | 12/2015 | Betzig ............ G02B 21/0064 |
| | | | 250/459.1 |
| 2016/0003740 | A1* | 1/2016 | Tao ............ G02B 21/16 |
| | | | 250/201.3 |
| 2016/0062111 | A1* | 3/2016 | Nobis ............ G02B 13/0095 |
| | | | 359/368 |
| 2016/0209646 | A1* | 7/2016 | Hattori ............ G02B 21/0096 |
| 2016/0266369 | A1* | 9/2016 | Hauger ............ G01B 11/24 |
| 2016/0327779 | A1* | 11/2016 | Hillman ............ G02B 21/361 |
| 2017/0258528 | A1* | 9/2017 | Bai ............ G01B 11/25 |
| 2018/0149854 | A1* | 5/2018 | Siebenmorgen ....... G02B 21/16 |
| 2018/0149855 | A1* | 5/2018 | Chou ............ G02B 21/26 |
| 2018/0164571 | A1* | 6/2018 | Ouchi ............ G02B 21/0088 |
| 2019/0155010 | A1* | 5/2019 | Hoegele ............ A61B 90/36 |
| 2019/0258053 | A1* | 8/2019 | Hattori ............ G02B 21/18 |

FOREIGN PATENT DOCUMENTS

| | | | | |
|---|---|---|---|---|
| DE | 102014112199 A1 * | 3/2016 | ......... | G02B 13/0095 |
| DE | 102014112199 A1 | 3/2016 | | |
| EP | 3048465 A1 | 7/2016 | | |
| FR | 2978254 A1 * | 1/2013 | ......... | G01N 21/6458 |
| WO | 2005119331 A1 | 12/2005 | | |
| WO | 2007134264 A2 | 11/2007 | | |
| WO | WO-2015041320 A1 * | 3/2015 | ................ | G01J 9/00 |

OTHER PUBLICATIONS

Y Lu et al. "Adaptive Optics Compensation or Aberrations Introduced by Sample Thickness Error in aSIL Confocal Scanning Microscopy" ISTFA 2013: Conference Proceedings from the 39th International SymposiumjcJr Testing and Failure Analysis, Nov. 7, 2013 (Nov. 7, 2013), pp. 417-419. Retrieved from the Internet: Retrieved from the Internet: http://ebookcentral.proquest.com/lib/epo-ebooks/reader.action ?docID=3002480&query=Adaptive&2BOptica%2BCompensation%2Bof%2BAberrations%2BIntroduced%2Bby%2BSample%2BThickness%2BError%2Bin%2BaSIL& 2BConfocal %2BScanninf&2BMicroscopy# [retrieved on Jun. 5, 2019]. XP055594157.

* cited by examiner

CAMERA MODULE FOR A MICROSCOPE, AND METHOD FOR OPERATING SAME

BACKGROUND OF THE INVENTION

Initially, the present invention relates to a camera module for a microscope. The camera module comprises an electronic image converter and an optical interface for introducing the camera module into an imaging beam path of the microscope. Furthermore, the invention relates to a method for operating the camera module.

U.S. Pat. No. 7,345,816 B2 has disclosed an optical microscope which comprises a mirror with a controllably changeable reflecting surface. By changing the surface of the mirror, it is possible to record images from different focal positions.

U.S. Pat. No. 7,269,344 B2 discloses an optical apparatus comprising an imaging optical system which comprises deformable mirrors and a digital zoom function. As a result of this, the electronic magnification should be alterable with high image sharpness.

DE 10 2014 112 199 A1 discloses a microscopic imaging system for wide field-microscopic imaging of a sample, comprising an adaptive optical element arranged in a pupil plane between an objective-side component and an image-side component. The adaptive optical element is preferably a membrane mirror or a spatial light modulator.

WO 2005/119331 A1 and WO 2007/134264 A2 disclose an optical component with an alterable focal length and a three-dimensional imaging system comprising such an optical component. The optical component represents a Fresnel mirror array and comprises a matrix of micromirrors which are each rotatable with two degrees of freedom and displaceable with one degree of freedom. This optical component is also referred to as micromirror array lens (MMAL) and allows all-in-focus images to be recorded.

U.S. Pat. No. 6,943,072 B1 discloses an optical component with an alterable focal length, which represents a Fresnel mirror array. This optical component comprises a matrix of micromirrors which are each rotatable with two degrees of freedom and displaceable with one degree of freedom. The rotation and displacement of the individual micromirrors is controlled by actuators.

US 2016/0327779 A1 describes a modularized structure of a microscope system.

DE 10 2012 017 917 A1 discloses a microscope module for introduction into a beam path of a light microscope. This microscope module comprises an adjustable deflection device for deflecting an incoming light beam.

DE 10 2008 041 821 A1 and U.S. Pat. No. 6,056,409 teach a video adapter for a microscope camera. The video adapter comprises an optical element for deflecting the beam path, which can be a mirror that can be swiveled about an x-axis with a motor and about a y-axis with another motor. The motors should allow an outcoupled image of an object to be steered onto an image plane of the camera. However, the optical element could also be a micromirror array. The micromirrors are intended to allow focusing, correction of imaging aberrations and setting of the magnification. Moreover, the video adapter comprises an optical element for setting the focus at the input of the video adapter.

SUMMARY OF THE INVENTION

Proceeding from the prior art, the object of the present invention consists of providing a camera module for a microscope, which allows microscopic images to be recorded outside of a focal plane of the microscope without having to alter the settings of the microscope. Furthermore, a method for operating the camera module should be provided.

The specified object is achieved by a camera module as claimed in appended claim 1 and by a method as claimed in appended additional independent claim 15.

The camera module according to the invention is provided for a microscope for examining a sample by microscopy. The microscope comprises an objective and optionally a zoom objective and/or a tube lens. In particular, the microscope comprises at least a changing device for objectives and/or a changing device for tube lenses and/or a magnification changing device. The microscope has an imaging beam path, in which the sample to be examined by microscopy is imaged. The camera module is designed to be attached to the microscope.

The camera module has an optical interface, by means of which it is introducible into the imaging beam path of the microscope. The camera module preferably also has a mechanical interface, by means of which it is detachably fastenable to the microscope. The optical interface is preferably integrated in the mechanical interface. The optical interface is preferably formed by an aperture. The mechanical interface is preferably formed by a fastening thread or by a bayonet connection. The imaging beam path of the microscope images a plane of the sample to be examined by microscopy into an intermediate image plane. In a nominal position of the microscope, the imaging beam path images a nominal object plane into a nominal intermediate image plane. Different object planes are imaged in different intermediate image planes. This is exploited when scanning planes of the sample. The camera module is embodied such that the nominal intermediate image plane assumes a fixed position in relation to the camera module. In this respect, the nominal intermediate image plane is at a fixed distance from the optical interface. The camera module is preferably embodied such that the nominal intermediate image plane lies within the camera module.

The camera module comprises an electronic image converter, by means of which an image of the sample to be examined by microscopy, cast onto the image converter, is convertible into an electrical signal. The image converter has a plane embodiment and is formed, for example, by a CCD or CMOS sensor.

The camera module comprises a functional element for altering an intermediate image plane, i.e., for altering a focal position or a position of an object plane. The functional element is arranged in a beam path of the camera module between the optical interface and the image converter. Using the functional element, the intermediate image plane or focal position of the camera module or of the unit formed by the camera module and the microscope can be displaced along the beam path, with the optical focal length changing in the process. By way of example, it is possible to make recordings of the sample in a plurality of object planes, in a manner analogous to a plurality of focal positions, in order to determine an image with an extended depth of field (enhanced depth of focus) from these recordings. In particular, the functional element should be positioned in a plane conjugate to an aperture stop of the microscope. The functional element renders rotationally symmetric phase differences generable and hence brings about focusing on other intermediate image planes to the nominal intermediate image plane and preferably also brings about correction of a spherical aberration induced by the defocusing in the microscope. By way of example, different objectives of the microscope or an optical zoom cause variations in a relative exit pupil position, which are compensatable in the camera module according to the invention by way of axial movements.

The camera module furthermore comprises a first optical assembly which has refractive power. The optical components of the microscope, at least comprising the first optical assembly and the functional element, have positive refractive power in their entirety from the optical interface to the image converter. The first optical assembly preferably comprises at least one optical lens. The first optical assembly is preferably formed by a lens group. The first optical assembly is arranged in the beam path between the optical interface and the image converter. The first optical assembly is arranged in the beam path, preferably between the optical interface and the functional element or preferably between the functional element and the image converter, depending on whether the camera module should be operated in a microscope with a convergent or divergent pupil beam path.

The beam path extending from the optical interface to the image converter need not lie along a single straight axis; instead, it could experience directional changes as a result of mirrors, for example. In any case, the beam path of the camera module forms a continuation of the imaging beam path of the microscope. Consequently, the beam path of the camera module and the imaging beam path of the microscope have a common axis at the optical interface, and preferably also at the first optical assembly.

According to the invention, a distance along the beam path between the functional element and the optical interface and/or a distance along the beam path between the first optical assembly and the optical interface is alterable in order to allow an image of an exit pupil of the microscope to be incident on the functional element. This image is preferably created by the first optical assembly or, alternatively, preferably created directly by the imaging beam path of the microscope. In those embodiments where the distance along the beam path between the first optical assembly and the optical interface is alterable, the first optical assembly is situated in the beam path between the optical interface and the functional element.

The distance along the beam path between the functional element and the optical interface is the length of the beam path from the functional element to the optical interface. The distance along the beam path between the first optical assembly and the optical interface is the length of the beam path from the first optical assembly to the optical interface.

Since the nominal intermediate image plane has a fixed distance from the optical interface, the feature according to the invention of the alterability of the distance along the beam path between the functional element and the optical interface or of the distance along the beam path between the first optical assembly and the optical interface is tantamount to an alterability of the distance along the beam path between the functional element and the nominal intermediate image plane or of the distance along the beam path between the first optical assembly and the nominal intermediate image plane.

At least one pupil plane is located between the nominal intermediate image plane relative to the optical interface and the nominal intermediate image plane relative to the image converter. The functional element should be positioned in one of these pupil planes such that the functional element lies in said pupil plane. A zoom movement in the microscope and/or an altered configuration, e.g., following an objective exchange, can lead to change in the relative exit pupil position of the microscope and hence to the need for a different axial position of the functional element.

A particular advantage of the camera module according to the invention consists of the fact that it facilitates, for example, the recording of images with an extended depth of field without this requiring modifications or extensions to the microscope.

To facilitate the alterability according to the invention of the distance along the beam path between the functional element and the optical interface or of the distance along the beam path between the first optical assembly and the optical interface, the functional element and/or the first optical assembly is preferably displaceable in a direction parallel to an axis of the beam path. The functional element or the first optical assembly is displaceable back and forth in the direction parallel to the axis of the beam path or along the axis of the beam path. This displacement movement is preferably controllable by an actuator.

To change the focusing, the functional element should preferably introduce a rotationally symmetric phase change into the luminous flux. Therefore, the functional element has a rotationally symmetric embodiment in preferred embodiments.

The functional element is preferably arranged perpendicular to an optical axis of the beam path at the functional element or extending through the functional element. This ensures that rotationally symmetric phase change is introduced into the luminous flux by the functional element.

In preferred embodiments of the camera module according to the invention, the functional element is formed by a microsystem having movable micromirrors. Each micromirror is preferably rotatable with two degrees of freedom and displaceable with one degree of freedom. The rotation and displacement of the individual micromirrors is preferably controllable by actuators. The micromirrors are preferably arranged concentrically in a plane.

In alternatively preferred embodiments, the functional element is formed by a deformable membrane mirror or by a deformable lens. The functional element can also be based on a different principle for altering the intermediate image plane.

Furthermore, the camera module according to the invention preferably comprises a beam splitter, which is preferably formed by a pole splitter. The beam splitter is arranged in the beam path between the optical interface and the functional element, preferably between the first optical assembly and the functional element, and preferably serves to direct an axial chief ray, split by the beam splitter, onto the reflecting functional element, from where the light of the chief ray is reflected and directed back to the beam splitter and passes through the beam splitter in the direction of the image converter. Splitting can be implemented in terms of intensity using a neutral intensity splitter or on the basis of polarization-optical principles using a polarization splitter and a functional group which rotates the polarization direction between the optical functional element and the polarization splitter. In order to direct the beam that has entered the beam splitter onto the reflecting functional element, the beam splitter preferably has a reflective effect, for example that of a partly transmissive mirror, which deflects the beam path through 90° toward the functional element. The light cast back by the functional element passes through the beam splitter without changing direction.

Preferred as an alternative, the beam splitter serves to allow the beam that has entered the beam splitter to pass toward the reflecting functional element without a change in direction, the light of the beam being directed back from said functional element to the beam splitter, which deflects the beam path through 90° to the image converter.

The beam splitter is preferably embodied as a polarizing beam splitter cube.

The camera module according to the invention preferably comprises a mirror, which directs the beam path entering the camera module to the image converter, with chief rays of the beam path entering the camera module being aligned parallel to chief rays of the beam path directed to the image converter. The mirror preferably serves to deflect the beam path leaving the beam splitter through 90° to the image converter. Consequently, the section of the beam path between the optical interface and the beam splitter is parallel to and offset from the section of the beam path between the mirror and the image converter.

In a first preferred embodiment of the camera module according to the invention, the functional element is displaceable parallel to the axis of the beam path of the camera module in order to make the distance along the beam path between the functional element and the optical interface alterable. This also renders the distance between the functional element and the nominal intermediate image plane alterable. Preferably, the functional element is displaceable parallel to the direction of the axis of the beam path of the camera module, together with the beam splitter and the mirror. The unit formed by the functional element, the beam splitter, and the mirror is preferably displaceable along the axis of the beam path of the camera module. Preferably, this axis coincides, at least in this section of the beam path, with the axis of the imaging beam path of the microscope entering into the camera module such that the unit formed by the functional element, the beam splitter, and the mirror is preferably also displaceable along the axis of the imaging beam path of the microscope entering into the camera module. The distance along the beam path between the first optical assembly and the optical interface is preferably unchangeable in this first preferred embodiment. Accordingly, the distance along the beam path between the first optical assembly and the nominal intermediate image plane is also unchangeable.

In a second preferred embodiment of the camera module according to the invention, the latter furthermore comprises a second optical assembly with a refractive power. The second optical assembly preferably comprises at least one optical lens. The second optical assembly is preferably formed by a lens group. The second optical assembly is arranged in the beam path between the mirror and the image converter. In this second preferred embodiment, the distance along the beam path between the functional element and the optical interface is alterable. Accordingly, the distance between the functional element and the nominal intermediate image plane is also alterable. Preferably, a distance between the unit formed by the functional element, the beam splitter and the mirror, and the optical interface is alterable. This also changes a distance between the unit formed by the functional element, the beam splitter and the mirror, and the first optical assembly and a distance between the unit formed by the functional element, the beam splitter and the mirror, and the second optical assembly. By contrast, the distance along the beam path between the first optical assembly and the optical interface is preferably unchangeable. Accordingly, the distance along the beam path between the first optical assembly and the nominal intermediate image plane is unchangeable. Preferably, a distance along the beam path between the second optical assembly and the optical interface is also preferably unchangeable. The functional element is preferably displaceable parallel to an axis of a section of the beam path extending between the functional element and the image converter or between the mirror and the image converter. The unit formed by the functional element, the beam splitter, and the mirror is preferably displaceable along the axis of the beam path of the camera module.

It is possible to vary the imaging scale between the nominal intermediate image plane and the image converter by way of an axial movement of the optical assemblies. The displacement of each optical assembly is accompanied by a variation of the pupil position downstream thereof. Obtaining the pupil position on the functional element can be ensured by coupling the movement of the optical assemblies; alternatively, this can be achieved by adjusting said functional element.

In a third preferred embodiment of the camera module according to the invention, the latter furthermore comprises a second optical assembly and a third optical assembly, each with a refractive power. The second optical assembly and the third optical assembly preferably each comprise at least one optical lens. The second optical assembly and the third optical assembly are preferably each formed by a lens group. The second optical assembly and the third optical assembly are arranged in the beam path between the beam splitter and the image converter. In this third preferred embodiment, the distance along the beam path between the first optical assembly and the optical interface is alterable. Accordingly, the distance along the beam path between the first optical assembly and the nominal intermediate image plane is also alterable. By contrast, the distance along the beam path between the functional element and the optical interface is preferably unchangeable. Consequently, the distance along the beam path between the functional element and the nominal intermediate image plane is unchangeable. The first optical assembly is displaceable along an axis of a section of the beam path of the camera module extending between the optical interface and the beam splitter. Preferably, this axis coincides, at least in this section of the beam path, with the axis of the imaging beam path of the microscope entering into the camera module such that the first optical assembly is preferably also displaceable along the axis of the imaging beam path of the microscope entering into the camera module. The second optical assembly and the third optical assembly are individually displaceable along an axis of a section of the beam path extending between the functional element and the image converter.

In a fourth preferred embodiment of the camera module according to the invention, the latter furthermore comprises a second optical assembly with a refractive power. The second optical assembly preferably comprises at least one optical lens. The second optical assembly is preferably formed by a lens group. The second optical assembly is arranged in the beam path between the beam splitter and the image converter. In this fourth preferred embodiment, the distance along the beam path between the first optical assembly and the optical interface is alterable. Accordingly, the distance along the beam path between the first optical assembly and the nominal intermediate image plane is also alterable. By contrast, the distance along the beam path between the functional element and the optical interface is preferably unchangeable. Consequently, the distance along the beam path between the functional element and the nominal intermediate image plane is unchangeable. The first optical assembly is displaceable along an axis of a section of the beam path extending between the optical interface and the beam splitter. Preferably, this axis coincides, at least in this section of the beam path, with the axis of the imaging beam path of the microscope entering into the camera module such that the first optical assembly is preferably also displaceable along the axis of the imaging beam path of the microscope entering into the camera module. The second optical assembly is displaceable along an axis of a section of the beam path extending between the functional element and the image converter.

The displacement of the first optical assembly and, optionally, of the second optical assembly and of the third optical assembly is preferably controllable by an actuator in each case.

A microscope according to the invention comprises an objective and optionally a zoom objective and/or a tube lens. In particular, the microscope comprises at least a changing device for objectives and/or a changing device for tube lenses and/or a magnification changing device. The microscope according to the invention also comprises the camera module according to the invention. The optical interface of the camera module is connected to an optical interface of the microscope. The camera module is introduced into an imaging beam path of the microscope that images an intermediate image. The microscope preferably comprises one of the described preferred embodiments of the camera module according to the invention.

The method according to the invention serves to operate the camera module according to the invention on a microscope. To this end, the camera module is attached to the microscope, as a result of which the optical interface of the camera module is introduced into a beam path of the microscope that images a nominal intermediate image. The distance along the beam path between the functional element and the optical interface or the distance along the beam path between the first optical assembly and the optical interface is set according to the invention in such a way that an image of an exit pupil of the microscope is incident on the functional element. Consequently, the distance along the beam path between the functional element and the nominal intermediate image plane or the distance along the beam path between the first optical assembly and the nominal intermediate image plane is set in such a way that the image of the exit pupil of the microscope cast by the first optical assembly is incident on the functional element.

Preferably, the method according to the invention is carried out using one of the described embodiments of the camera module according to the invention. Preferably, the method according to the invention also has features which have been specified in conjunction with the camera module according to the invention. The microscope equipped with the camera module preferably comprises a control unit which is configured to carry out the method according to the invention or one of the preferred embodiments of the method according to the invention. The control unit is preferably embodied to coordinate a configuration of the microscope and of the camera module, specifically a relative position of the exit pupil with an image of the exit pupil on the functional element. The control unit is preferably configured to control the microscope and the camera module in such a way that the nominal intermediate image plane is imaged onto the image converter in a basic position of the functional element. Preferably, the control unit is configured to synchronize a functional position of the functional element with the image converter.

A first preferred embodiment of the method according to the invention is used to operate the first preferred embodiment of the camera module according to the invention on a microscope. In this first embodiment, the functional element is displaced parallel to the axis of the beam path in order to set the distance along the beam path between the functional element and the optical interface. Preferably, the functional element is displaced parallel to the axis of the beam path of the camera module, together with the beam splitter and the mirror. Consequently, the functional element is displaced together with the beam splitter and the mirror parallel to the axis of the imaging beam path of the microscope entering the camera module since, at least in this section, this axis coincides with the beam path of the camera module. The distance along the beam path between the first optical assembly and the optical interface is preferably not altered in this first preferred embodiment. In this first embodiment, the control unit is preferably configured to derive the displacement of the functional element from the relative position of the exit pupil and to initiate said displacement. Furthermore, the control unit is preferably configured to derive from the microscope the characteristic of the effect of the functional element and to synchronize the functional position thereof with the image converter.

A second preferred embodiment of the method according to the invention is used to operate the second preferred embodiment of the camera module according to the invention on a microscope. In this second embodiment, the functional element is displaced parallel to the axis of the section of the beam path extending between the functional element or the mirror and the image converter in order to set the distance along the beam path between the functional element and the optical interface. Preferably, the unit formed by the functional element, the beam splitter, and the mirror is displaced parallel to the axis of the section of the beam path extending between the functional element or the mirror and the image converter in order to set the distance along the beam path between the functional element and the optical interface. The distance along the beam path between the first optical assembly and the optical interface is preferably not altered in this second preferred embodiment. In this second embodiment, the control unit is preferably configured to derive the displacement of the functional element from the relative position of the exit pupil and to initiate said displacement. Furthermore, the control unit is preferably configured to derive from the microscope the characteristic of the effect of the functional element and to synchronize the functional position thereof with the image converter.

A third preferred embodiment of the method according to the invention is used to operate the third preferred embodiment of the camera module according to the invention on a microscope. In this third embodiment, the first optical assembly is displaced along the axis of the section of the beam path extending between the optical interface and the beam splitter in order to set the distance along the beam path between the first optical assembly and the optical interface. Consequently, the first optical assembly is preferably displaced along the axis of the imaging beam path of the microscope entering the camera module since, at least in this section, this axis coincides with the beam path of the camera module. Moreover, the second optical assembly and the third optical assembly are displaced along the axis of the section of the beam path extending between the functional element and the image converter in order to image the image cast by the first optical assembly onto the image converter without changing an imaging scale. The distance along the beam path between the functional element and the optical interface is preferably not altered in this third preferred embodiment. In this third embodiment, the control unit is preferably configured to derive the displacement of the first optical assembly from the relative position of the exit pupil and to initiate said displacement. In this third embodiment, the control unit is preferably configured to derive the displacement of the second and third optical assembly from the relative position of the exit pupil or from the displacement of the first optical assembly and to initiate said displacement. Furthermore, the control unit in this third embodiment is preferably configured to derive from the microscope the characteristic of the effect of the functional element and to synchronize the functional position thereof with the image converter.

A fourth preferred embodiment of the method according to the invention is used to operate the fourth preferred embodiment of the camera module according to the invention on a microscope. In this fourth embodiment, the first optical assembly is displaced along the axis of the section of the beam path extending between the optical interface and the beam splitter in order to set the distance along the beam path between the first optical assembly and the optical interface. Consequently, the first optical assembly is preferably displaced along the axis of the imaging beam path of the microscope entering the camera module since, at least in this section, this axis coincides with the beam path of the camera module. Moreover, the second optical assembly is displaced along the axis of the section of the beam path extending between the functional element and the image converter in order to compensate the change, induced by the displacement of the first optical assembly, of the imaging scale of the imaging of the nominal intermediate image plane on the image converter. The change in the relative focal position of the imaging of the nominal intermediate image plane on the image converter, induced by the displacement of the first optical assembly, is compensated by a modified characteristic in the functionality of the functional element. The distance along the beam path between the functional element and the optical interface is preferably not altered in this fourth preferred embodiment. In this fourth embodiment, the control unit is preferably configured to derive the displacement of the first optical assembly from the relative position of the exit pupil and to initiate said displacement. In this fourth embodiment, the control unit is preferably configured to derive the displacement of the second optical assembly from the relative position of the exit pupil or from the displacement of the first optical assembly and to initiate said displacement. Furthermore, the control unit in this fourth embodiment is preferably configured to derive from the microscope the characteristic of the effect of the functional element and to synchronize the functional position thereof with the image converter.

BRIEF DESCRIPTION OF THE DRAWINGS

Further details and developments of the invention will become apparent from the following description of preferred embodiments of the invention, with reference being made to the drawing. In the figures.

DETAILED DESCRIPTION

Figure 1:
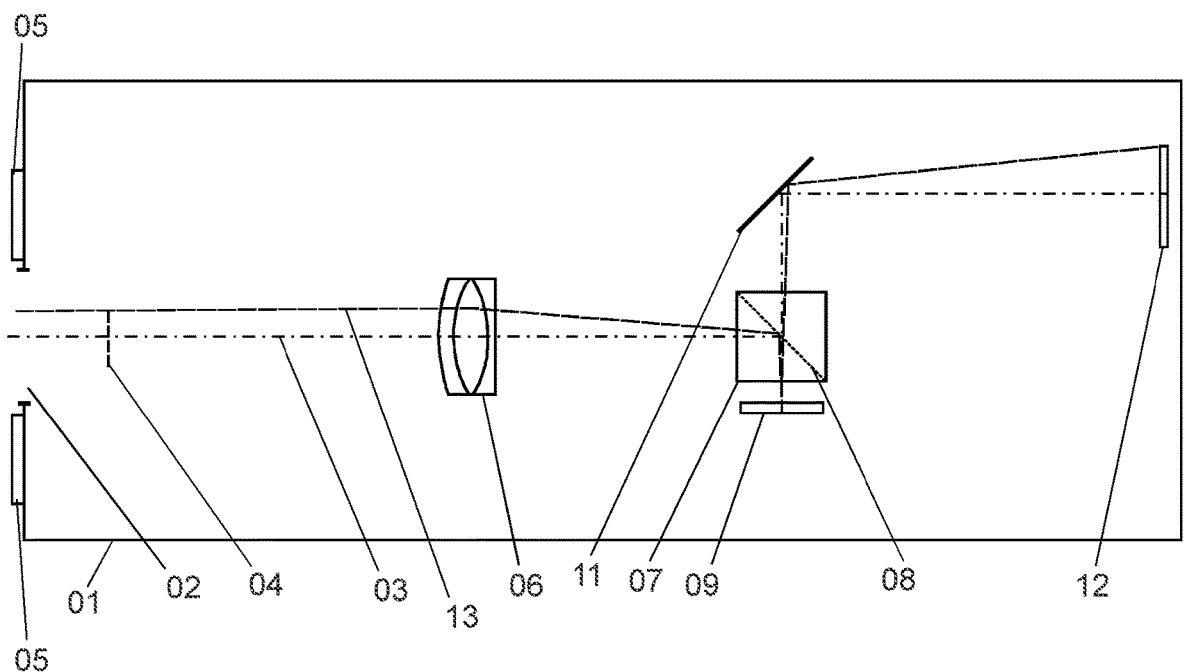
FIG. 1: shows a first preferred embodiment of a camera module according to the invention in a first state.

FIG. 1 shows a first preferred embodiment of a camera module according to the invention in a first state in a symbolized sectional view. The camera module comprises a housing 01, by means of which the camera module is attachable to a microscope (not shown). The camera module has an optical interface 02 to the microscope (not shown), which is formed by an aperture in the housing 01. This optical interface 02 is integrated in a mechanical interface 105 of the camera module.

By attaching the camera module to the microscope (not shown), an optical axis 03 of the camera module is aligned with an optical axis (not shown) of an image beam path of the microscope. The imaging beam path (not shown) of the microscope casts an intermediate image of a sample (not shown) to be examined by microscopy into an intermediate image plane, with a nominal intermediate image plane 04, in particular, being illustrated, into which a nominal intermediate image is cast when the microscope (not shown) is situated in a nominal position.

Along the optical axis 03 there are, firstly, a first lens group 06 and, furthermore, a beam splitter cube 07. The beam splitter cube 07 comprises a partly transmissive mirror 08, which acts as a pole splitter. The partly transmissive mirror 08 deflects an incident beam path (not illustrated) through 90° such that the latter is directed on a functional element 09. The functional element 09 is used to displace an intermediate image plane and is formed by a variable segment mirror, and so it comprises many concentrically arranged mirror elements (not shown). The mirror elements (not shown) have the same distance from the center and have the same characteristic in respect of an angle change between a mirror normal and perpendicular to the individual mirror elements (not shown) in the radial direction. The functional element 09 is a micromirror array lens (MMAL) or a mirror array lens system (MALS), as described in WO 2005/119331 A1 and WO 2007/134264 A2. The beam path (not illustrated) directed to the functional element 09 is linearly polarized upstream of the partly transmissive mirror 08 and strikes the functional element 09 in perpendicular fashion. The polarization direction is rotated through 90° in two passes through a λ/4 plate (not illustrated) between the beam splitter cube 07 and the functional element 09. The beam path (not illustrated) directed on the functional element 09 is reflected by the functional element 09 such that it is directed back to the beam splitter cube 07, said beam path passing through the beam splitter cube without deflection and striking a mirror 11. The mirror 11 deflects the beam path (not illustrated) through 90° such that the optical axis 03 also experiences another directional change of 90°. The beam path (not illustrated) is directed to an image converter 12, by means of which the image of the sample (not shown) cast onto the image converter 12 is converted into an electronic signal.

In this first preferred embodiment, the unit formed by the functional element 09, the beam splitter cube 07, and the mirror 11 is displaceable along the optical axis 03 in order to be able to set the distance along the optical axis 03 between the functional element 09 and the nominal intermediate image plane 04 so that the image of the sample (not shown) imaged by the first lens group 06 is incident on the image converter 12. An exit pupil (not shown) of the microscope imaged by the first lens group 06 is located on the functional element 09. The distance along the optical axis 03 between the first lens group 06 and the nominal intermediate image plane 04 is unchangeable.

According to the invention, object planes should be imaged in focus on the image converter 12 away from a nominal position. At the optical interface 02, these have a different distance from the optical interface 02 than the nominal intermediate image plane 04. From the respective intermediate image plane, a wavefront (not illustrated) propagates along center rays 13 to the functional element 09. On account of the defocusing and also on account of aberrations induced thereby in the object space of the microscope (not illustrated), the wavefront (not illustrated) at the functional element 09 is deformed in relation to the wavefront (not illustrated) of the imaging of the nominal object plane. The functional element 09 compensates this deformation, and so the wavefront (not illustrated) between the functional element 09 and the image converter 12 has the same form as the wavefront when imaging the nominal intermediate image plane 04 and an image from the plane deviating from the nominal position of the object (not illustrated) of the microscope arises at the image converter 12. In general, the location of the exit pupil (not illustrated) as an image of the aperture stop in the microscope (not illustrated) varies when changing an objective (not illustrated), a tube lens (not illustrated) or a setting of a magnification changer (not illustrated) on the microscope. Moreover, zoom microscopes (not illustrated) can have magnification-dependent relative exit pupil positions. For the functionality of the camera module according to the invention, the functional element 09 should be arranged in optically conjugate fashion with respect to the exit pupil (not illustrated). This conjugation is achieved by a variability in the position along the optical axis 03 of the unit formed by the functional element 09, the beam splitter cube 07, and the mirror 11. Depending on the relative position of the exit pupil (not illustrated), the unit formed by the functional element 09, the beam splitter cube 07, and the mirror 11 is displaced until the center rays 13 strike the functional element 09 centrally. This adjustment is implemented when changing the relative exit pupil position (not illustrated) of the microscope.

Figure 2:
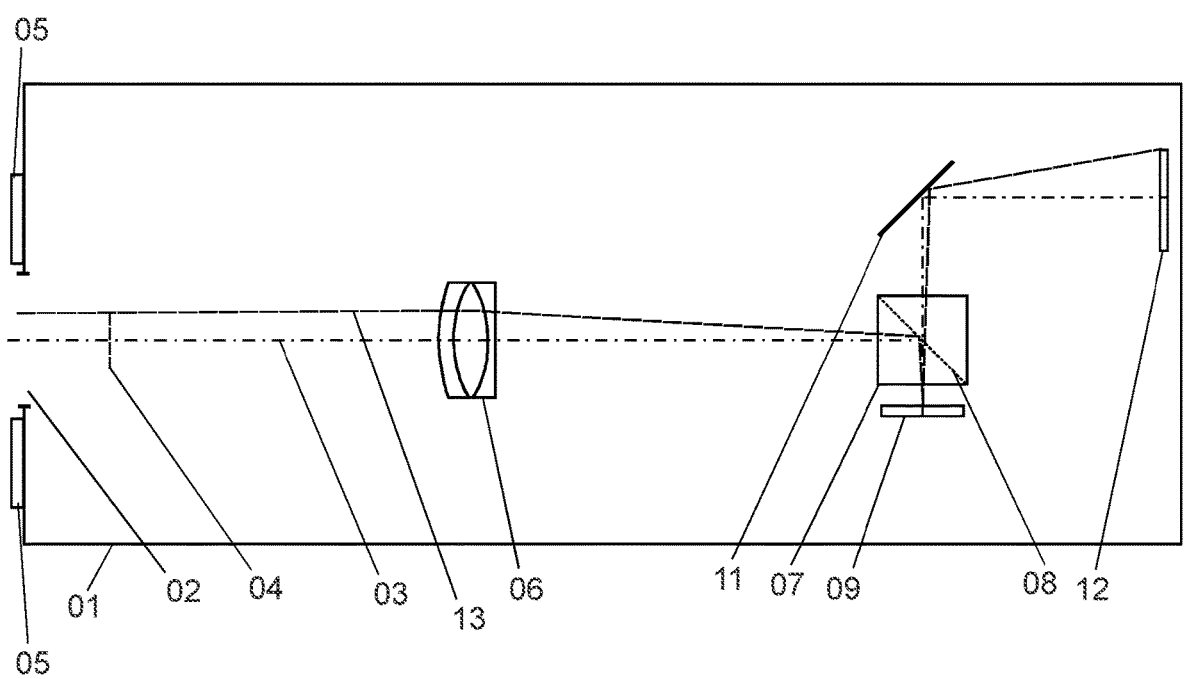
FIG. 2: shows the first embodiment of the camera module, shown in FIG. 1, in a second state.

FIG. 2 shows the first embodiment of the camera module, shown in FIG. 1, in a second state after the unit formed by the functional element 09, the beam splitter cube 07, and the mirror 11 has been displaced along the optical axis 03.

Figure 3:
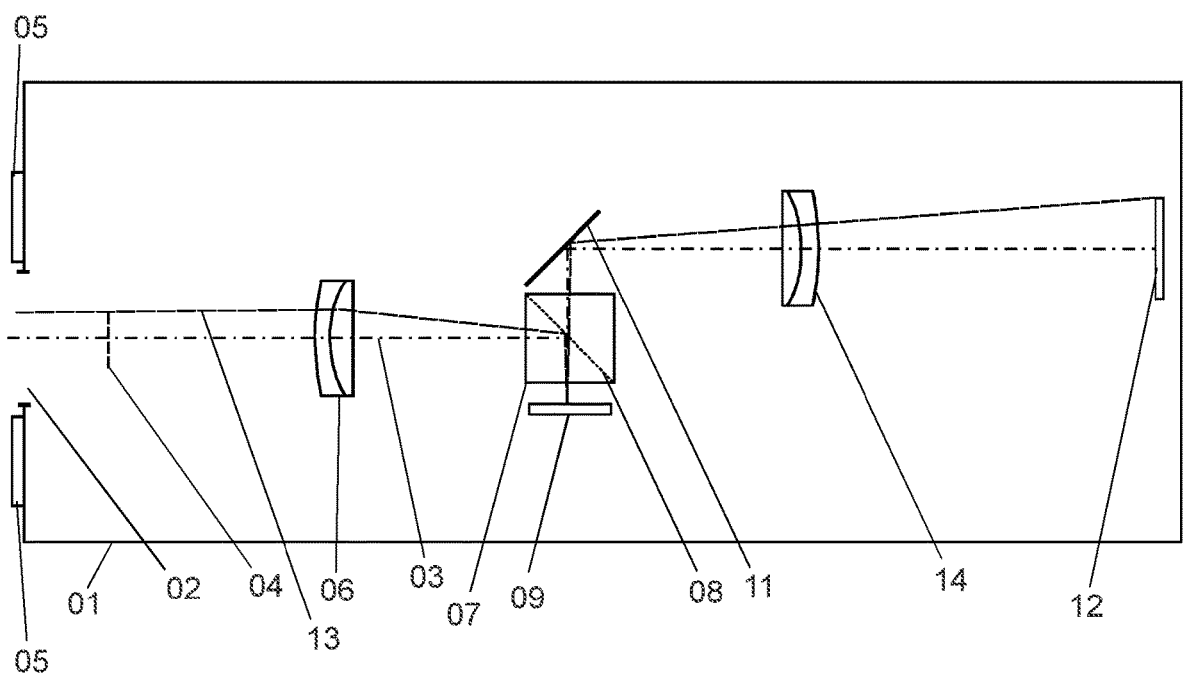
FIG. 3: shows a second preferred embodiment of the camera module according to the invention in a first state.

FIG. 3 shows a second preferred embodiment of the camera module according to the invention in a first state in a symbolized sectional view. At first, this second embodiment resembles the first embodiment shown in FIG. 1. In contrast to the first embodiment shown in FIG. 1, the second embodiment furthermore comprises a second lens group 14 between the mirror 11 and the image converter 12.

In this second preferred embodiment, too, the unit formed by the functional element 09, the beam splitter cube 07, and the mirror 11 is displaceable along the optical axis 03 in order to be able to set the distance along the optical axis 03 between the functional element 09 and the nominal intermediate image plane 04 so that the image of the sample (not shown) imaged by the first lens group 06 and the second lens group 14 is incident on the image converter 12. An exit pupil (not shown) of the microscope imaged by the first lens group 06 is located on the functional element 09. The distance along the optical axis 03 between the first lens group 06 and the nominal intermediate image plane 04 is unchangeable.

The distance along the optical axis 03 between the second lens group 14 and the nominal intermediate image plane 04 is likewise unchangeable.

Figure 4:
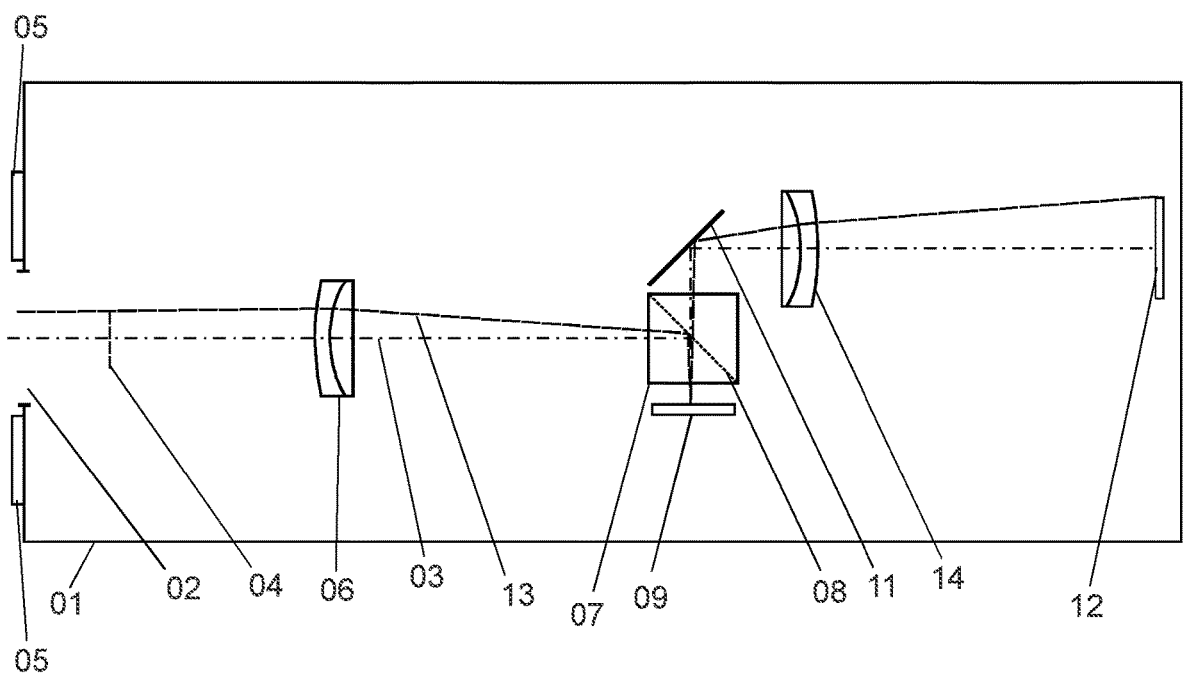
FIG. 4: shows the second embodiment of the camera module, shown in FIG. 3, in a second state.

FIG. 4 shows the second embodiment of the camera module, shown in FIG. 3, in a second state after the unit formed by the functional element 09, the beam splitter cube 07, and the mirror 11 has been displaced along the optical axis 03.

Figure 5:
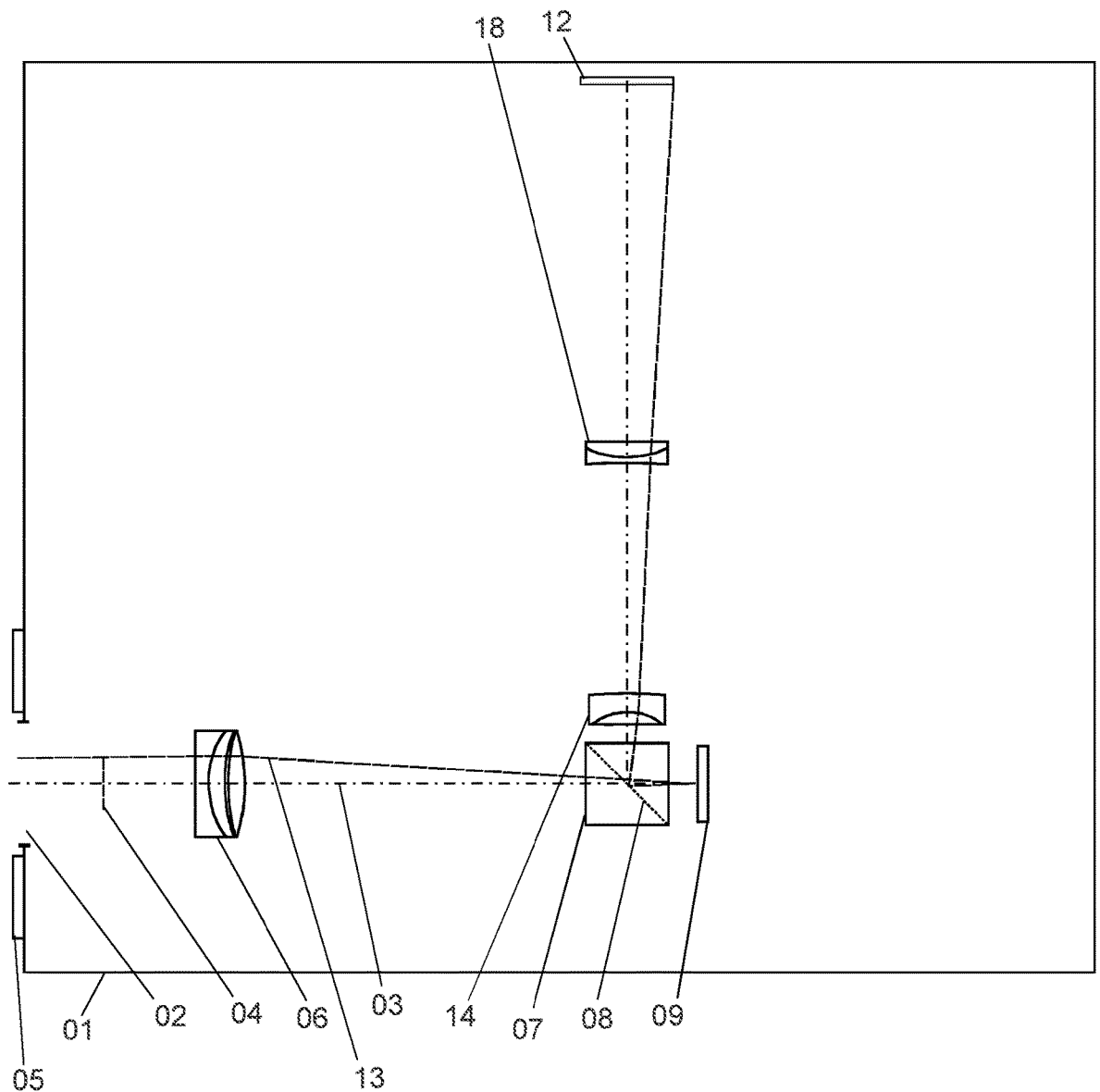
FIG. 5: shows a third preferred embodiment of the camera module according to the invention in a first state.

FIG. 5 shows a third preferred embodiment of the camera module according to the invention in a first state in a symbolized sectional view. At first, this third embodiment resembles the second embodiment shown in FIG. 3. In contrast to the second embodiment shown in FIG. 3, the third embodiment does not comprise the mirror 11 (shown in FIG. 3), and so the beam path (not illustrated) is not deflected through 90° again and the optical axis 03 experiences no further directional change. Moreover, a third lens group 18 is arranged between the second lens group 14 and the image converter 12.

In this third preferred embodiment, the first lens group 06 is displaceable along the optical axis 03 in order to be able to set the distance along the optical axis 03 between the first lens group 06 and the nominal intermediate image plane 04 so that the image of the sample (not shown) imaged by the first lens group 06, the second lens group 14, and the third lens group 18 is incident on the image converter 12 with a constant imaging scale. An exit pupil (not shown) of the microscope imaged by the first lens group 06 is located on the functional element 09. The distance along the optical axis 03 between the functional element 09 and the nominal intermediate image plane 04 is unchangeable.

The image of the sample (not shown) is transmitted with a variable transmission length and with a variable imaging scale as a result of the displacement of the first lens group 06. Overall, the transmission length and the imaging scale are kept constant, for the purposes of which the second lens group 14 and the third lens group 18 are displaced along the optical axis 03. A displacement position of the first lens group 14 in relation to the nominal intermediate image plane 04, a displacement position of the second lens group 14 in relation to the image converter 12, and a displacement position of the third lens group 18 in relation to the image converter 12 are determined for each relative position of a pupil of the microscope (not shown) such that there is no change in the imaging scale.

Figure 6:
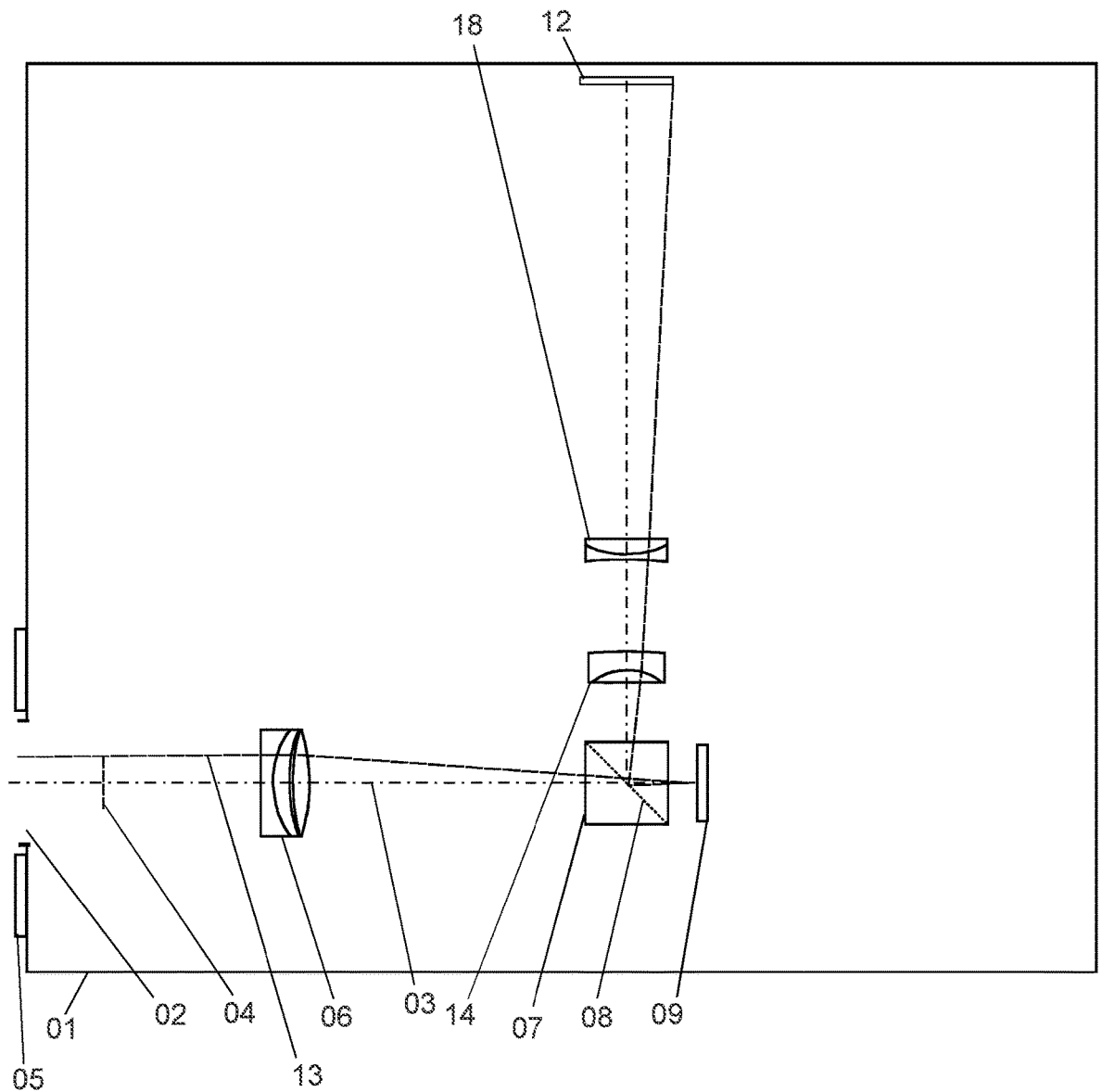
FIG. 6: shows the third embodiment of the camera module, shown in FIG. 5, in a second state.

FIG. 6 shows the third embodiment of the camera module, shown in FIG. 5, in a second state after the first lens group 06, the second lens group 14, and the third lens group 18 have been displaced along the optical axis 03.

In relation to the optical axis 03, the order of the optically effective components between the nominal intermediate image plane 04 and the image converter 12 can be changed without this changing the functionality in the embodiments shown in FIG. 1, FIG. 2, FIG. 5 and FIG. 6. It is likewise possible to add further optically refractive components and deflection elements without influencing the functionality described.

Figure 7:
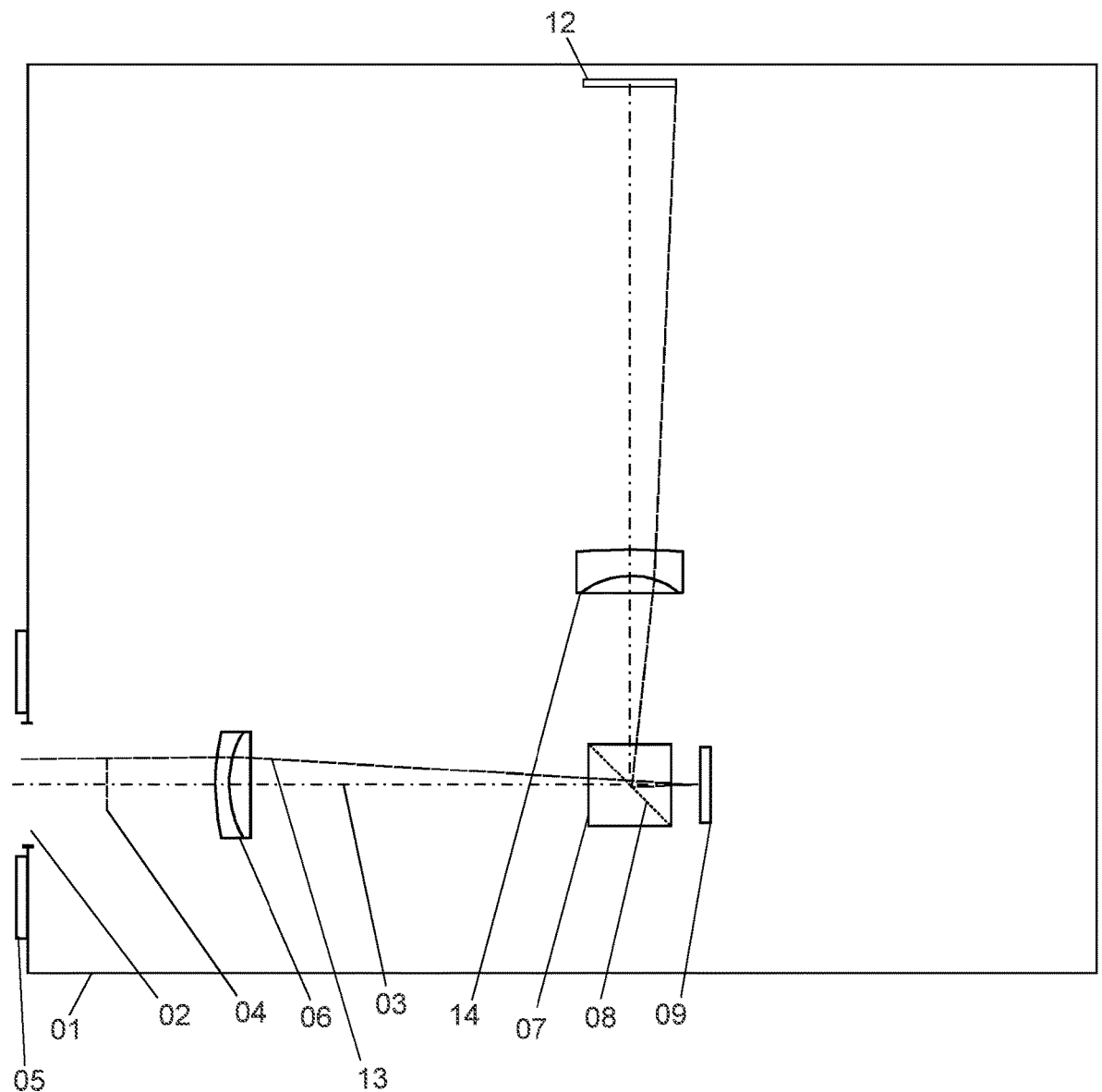
FIG. 7: shows a fourth preferred embodiment of the camera module according to the invention in a first state.

FIG. 7 shows a fourth preferred embodiment of the camera module according to the invention in a first state in a symbolized sectional view. At first, this fourth embodiment resembles the third embodiment shown in FIG. 5. In contrast to the third embodiment shown in FIG. 5, the fourth embodiment does not have the third lens group 18 (shown in FIG. 5).

In this fourth preferred embodiment, the first lens group 06 is displaceable along the optical axis 03 in order to be able to set the distance along the optical axis 03 between the first lens group 06 and the nominal intermediate image plane 04 so that the exit pupil (not shown) of the microscope imaged by the first lens group 06 is located on the functional element 09. The distance along the optical axis 03 between the functional element 09 and the nominal intermediate image plane 04 is unchangeable.

The image of the sample (not shown) is transmitted with a variable transmission length and with a variable imaging scale as a result of the displaceable first lens group 06. The imaging scale is kept constant, for the purposes of which the second lens group 14 is displaced along the optical axis 03. The transmission length is kept constant by the functional element 09; this represents a further function of the functional element 09 on top of its function for altering the intermediate image plane. A displacement position of the first lens group 14 in relation to the nominal intermediate image plane 04 and a displacement position of the second lens group 14 in relation to the image converter 12, and an effect of the functional element 09 are determined for each relative position of a pupil of the microscope (not shown) such that there is no change in the imaging scale.

The function of the functional element 09 is described below by considering an imaging chain from the image converter 12 to the sample (not shown) to be examined by microscopy. By varying the profile of the functional element 09 formed by a segment mirror, a sensor plane is imaged into a plane displaced by $\Delta s'$ with respect to the nominal intermediate image plane 04. This is continued along centroid rays of the beam path (not illustrated) in an object space (not illustrated) of the microscope. Approximately $\Delta s = \Delta s'/\beta^2$ applies, where $\beta$ is the imaging scale of the microscope and $\Delta s$ is a distance between a sample plane and a nominal object plane (not shown) of the microscope. Consequently, imaging objects at the distance $\Delta s$ from the object plane (not shown) of the microscope is possible by a targeted change in the profile of the functional element 09 formed by a segment mirror. When a microscope (not shown) is used outside its designated focus position there is a spherical aberration that scales with the numerical aperture of the microscope. This is preferably compensated by targeted deviation of the profile of the functional element 09 formed by a segment mirror for a focus shift.

If the microscopic imaging deviates from the object-side telecentricity, there is a change in the imaging scale of the images recorded from different object distances. For a center ray angle $\delta$, there is a change in an object height of $\Delta y = \Delta s \tan(\delta)$. This change is linear in $\Delta s$ and is preferably compensated with the aid of subsequent image processing.

Figure 8:
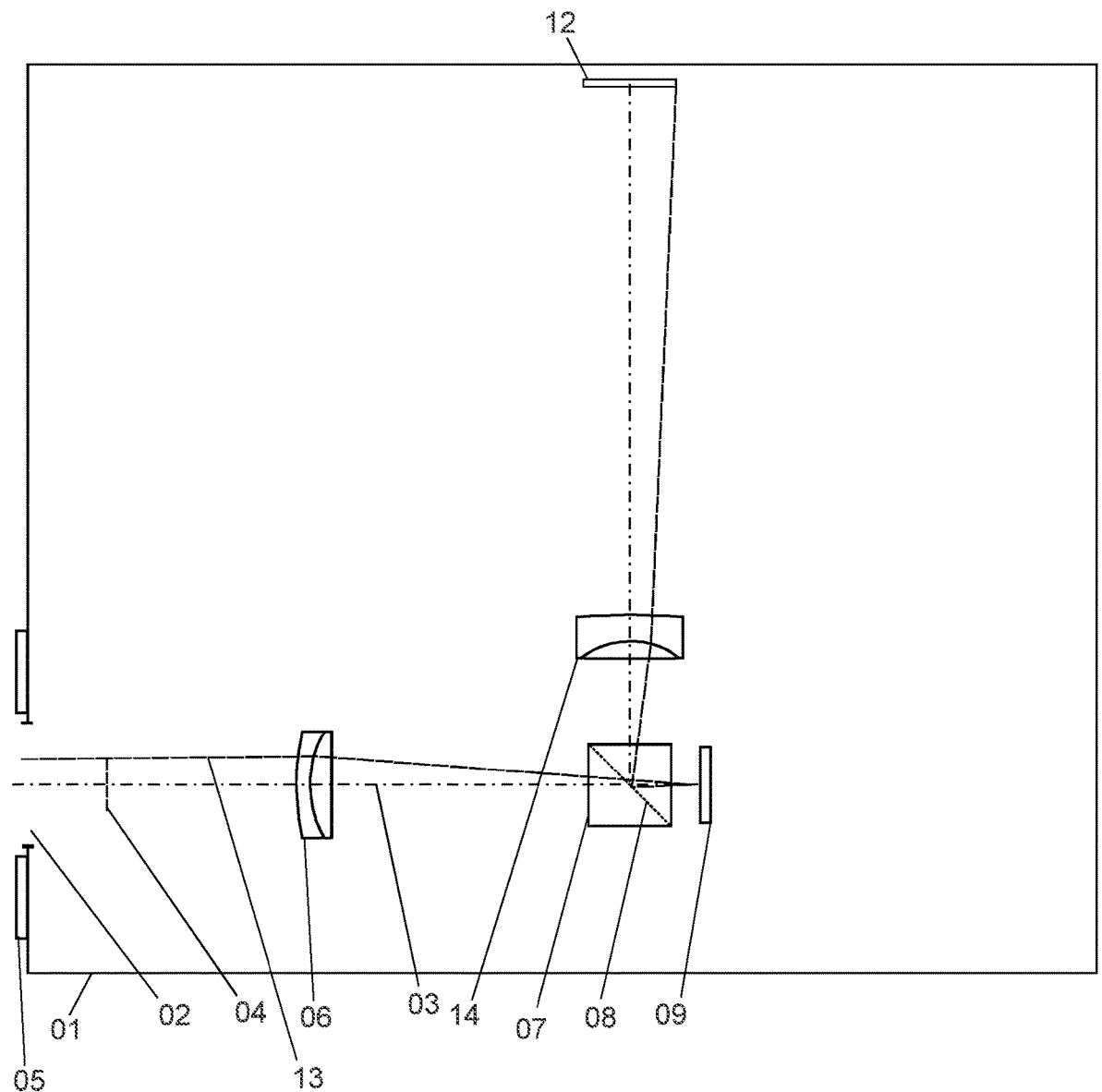
FIG. 8: shows the fourth embodiment of the camera module, shown in FIG. 7, in a second state.

FIG. 8 shows the fourth embodiment of the camera module, shown in FIG. 7, in a second state after the first lens group 06 and the second lens group 14 have been displaced along the optical axis 03.

The invention claimed is:

1. A camera module for a microscope, comprising:
   an optical interface for introducing the camera module into an imaging beam path of the microscope that images a nominal intermediate image;
   an electronic image converter;
   a functional element for altering an intermediate image plane, said functional element being arranged in a beam path of the camera module between the optical interface and the image converter; and
   a first optical assembly with a refractive power, wherein the first optical assembly is arranged in the beam path between the optical interface and the image converter; and wherein a distance along the beam path between the functional element and the optical interface or a distance along the beam path between the first optical assembly and the optical interface is alterable; and
   a mechanical interface configured to detachably fasten said camera module to the microscope, wherein the optical interface is integrated in the mechanical interface.

2. The camera module as claimed in claim 1, wherein the functional element is arranged perpendicular to an optical axis of the beam path extending along the functional element.

3. The camera module as claimed in claim 1, wherein the functional element or the first optical assembly is displaceable in a direction parallel to an axis of the beam path.

4. The camera module as claimed in claim 3, wherein it furthermore comprises at least one actuator, the latter rendering the displacement of the functional element or of the first optical assembly in the direction parallel to the axis of the beam path controllable.

5. The camera module as claimed in claim 1, wherein the functional element is formed by a microsystem having movable micromirrors.

6. The camera module as claimed in claim 5, wherein the micromirrors are each rotatable with two degrees of freedom and displaceable with one degree of freedom.

7. The camera module as claimed in claim 1, wherein the functional element is formed by a deformable membrane mirror or by a deformable lens.

8. The camera module as claimed in claim 1, further comprising a beam splitter, the latter being arranged in the beam path of the camera module between the first optical assembly and the functional element.

9. The camera module as claimed in claim 8, wherein the beam splitter is embodied as a polarizing beam splitter cube.

10. The camera module as claimed claim 8, further comprising a mirror, the latter directing the beam path toward the image converter, wherein chief rays of the beam path entering into the camera module are aligned parallel to chief rays of the beam path directed toward the image converter.

11. The camera module as claimed in claim 10, wherein the distance along the beam path between the functional element and the optical interface is alterable, for the purposes of which the functional element is displaceable together with the beam splitter and the mirror along the axis of the beam path of the camera module.

12. The camera module as claimed in claim 11, wherein it comprises a second optical assembly, the latter being arranged in the beam path between the mirror and the image converter.

13. The camera module as claimed in claim 8, further comprising a second optical assembly and a third optical assembly, which are arranged in the beam path between the beam splitter and the image converter, wherein the distance along the beam path between the first optical assembly and the optical interface is alterable, wherein the first optical assembly is displaceable along the axis of a section of the beam path of the camera module extending between the optical interface and the beam splitter, and wherein the second optical assembly and the third optical assembly are individually displaceable along the axis of a section of the beam path of the camera module extending between the functional element and the image converter.

14. The camera module as claimed in claim 8, further comprising a second optical assembly, which is arranged in the beam path between the beam splitter and the image converter, wherein the distance along the beam path between the first optical assembly and the optical interface is alterable, wherein the first optical assembly is displaceable along the axis of a section of the beam path of the camera module extending between the optical interface and the beam splitter and wherein the second optical assembly is displaceable along the axis of a section of the beam path of the camera module extending between the functional element and the image converter.

15. A method for operating a camera module as claimed in claim 1 on a microscope, wherein the optical interface of the camera module is introduced into a beam path of the microscope imaging a nominal intermediate image, and wherein the distance along the beam path between the functional element and the optical interface or the distance along the beam path between the first optical assembly and the optical interface is set in such a way that an image of an exit pupil of the microscope is incident on the functional element.

\* \* \* \* \*